United States Patent [19]

Honda

[11] Patent Number: 5,205,584
[45] Date of Patent: Apr. 27, 1993

[54] AIR BAG SYSTEM AND PROCESS FOR PRODUCING THE SAME

[75] Inventor: Kiyoshi Honda, Saitama, Japan

[73] Assignee: Honda Giken Kogyo Kabushiki Kaisha, Tokyo, Japan

[21] Appl. No.: 726,432

[22] Filed: Jul. 5, 1991

[51] Int. Cl.⁵ ............................................. B60R 21/16
[52] U.S. Cl. .................................................. 280/743
[58] Field of Search ........................ 280/730, 743, 731

[56] References Cited

U.S. PATENT DOCUMENTS

| | | | |
|---|---|---|---|
| 3,727,942 | 4/1973 | Arntson | 280/743 |
| 3,799,576 | 3/1974 | Fiala | 280/743 |
| 3,831,972 | 8/1974 | Allgaier et al. | 280/730 |
| 4,793,631 | 12/1988 | Takada | 280/743 |
| 4,830,401 | 5/1989 | Honda | 280/743 |
| 4,887,842 | 12/1989 | Sato | 280/730 |
| 5,033,771 | 7/1991 | Miyauchi | 280/730 |
| 5,078,423 | 1/1992 | Fujita | 280/743 |

FOREIGN PATENT DOCUMENTS

| | | | |
|---|---|---|---|
| 2333888 | 1/1974 | Fed. Rep. of Germany | 280/743 |
| 2552815 | 5/1977 | Fed. Rep. of Germany | 280/743 |
| 61-11084 | 4/1986 | Japan . | |
| 0122751 | 5/1989 | Japan | 280/743 |

*Primary Examiner*—Tamara L. Graysay
*Attorney, Agent, or Firm*—Armstrong, Westerman, Hattori, McLeland & Naughton

[57] ABSTRACT

Tip ends of hanging strings are connected to appropriate portions on an inner surface of an air bag having an opening portion mounted around an outer periphery of a gas generator, while base ends of the hanging strings are fixed to a retaining ring. The retaining ring is secured to a mounting base so as to clamp and fix the opening portion of the air bag between the retaining ring and the mounting base. When the air bag opening portion is to be fixed to another retaining ring, both the retaining rings for the hanging rings and the air bag opening portion are overlapped to each other and secured to the mounting base. This achieves a simplification in structure of an air bag system and in procedure of assembling the same.

2 Claims, 9 Drawing Sheets

AIR BAG SYSTEM AND PROCESS FOR PRODUCING THE SAME

BACKGROUND OF THE INVENTION

1. Field of the Invention

The field of the present invention is air bag systems to be mounted at a central portion of a steering wheel or at an instrument panel for protecting an occupant from a shock upon a collision of a vehicle, and processes for producing the same.

2. Description of the Prior Art

There are conventionally known air bag systems designed so that when a shock more than a given value due to a collision of a vehicle is sensed, an air bag is inflated by a high pressure gas and developed into a vehicle compartment, thereby protecting an occupant from a secondary collision by a cushioning effect of the air bag. In general, such air bag system is adapted to be mounted at a central portion of a steering wheel or at an instrument panel in order to protect the occupant on a driver's seat or on an assistant's seat.

However, an air bag in such an air bag system is made of a soft material such as a synthetic fiber or the like and hence, it is relatively difficult to shape the inflated air bag into a shape suitable for holding or restraining the occupant. Therefore, in an air bag system of a type generally known, an air bag means is comprised of a main bag and an auxiliary bag, so that the inflated air bags may be shaped into shapes suitable for holding the occupant.

However, the air bag system of the above type requires not only two independent air bags but also two gas generators for inflating the air bags, thereby bringing about an increase in cost accompanied by a complication in structure.

Therefore, an air bag system has been proposed in which a hanging string is stretched as a tension member within an air bag. In such system, the air bag is inflated and developed into a shape suitable for holding an occupant by restraining the inflation of the air bag by a tension acting on the hanging string (for example, see Japanese Utility Model Publication Kokoku No. 11084/86).

In the above air bag system, however, in producing the air bag, a base end of the hanging string has previously been sewn to the air bag, then an opening portion of the air bag is mounted to a mounting base of a container having a gas generator mounted thereto so as to improve the assembling property. Therefore, such air bag system suffers from a problem that when sewing the hanging string to the air bag, it is difficult to do so unless the air bag is once turned inside out. This results in a very inferior workability.

SUMMARY OF THE INVENTION

Accordingly, it is an object of the present invention to improve the workability for securing the hanging string and the air bag to the mounting base.

To achieve the above object, according to the present invention, there is provided an air bag system comprising a gas generator, a mounting base mounted around an outer periphery of the gas generator, and an air bag having an opening portion attached to the mounting base, wherein hanging strings are connected at tip ends thereof to appropriate portions on an inner surface of the air bag, a retaining ring being fixed to the mounting base in a state where the opening portion of the air bag is clamped and secured between the retaining ring and the mounting base, the hanging strings being connected at base ends to the retaining ring.

In the above arrangement, the opening portion of the air bag may be fixed to another retaining ring, and both the retaining rings for the hanging strings and the air bag opening portion may be overlapped to each other and secured to the mounting base.

In addition, steps may be provided in a recessed manner in the retaining ring for the hanging strings, and the base end of each hanging string may be fixed to the step. Further, an adhesive may be applied among the base end of the hanging string, the opening portion of the air bag, the retaining ring and the mounting base.

Further, according to the present invention, there is provided a process for producing an air bag system, comprising the steps of: sewing tip ends of hanging strings to appropriate portions on a back surface of an upper base fabric; overlapping a front surface of a lower base fabric having an opening portion provided at a central portion thereof, onto a front surface of the upper base fabric and sewing outer peripheries of the two base fabrics to each other; turning the lower base fabric inside out and leading the base ends of the hanging strings out of the opening portion of the lower base fabric; fixing a retaining ring to the base ends of the hanging strings; and securing the retaining ring to a mounting base provided around a gas generator, so that the opening portion of the lower base fabric is clamped and fixed between the retaining ring and the mounting base. Yet further, according to the present invention, there is provided a process for producing an air bag system, comprising the steps of: sewing tip ends of hanging strings to appropriate portions on a back surface of an upper base fabric; overlapping a front surface of a lower base fabric having an opening portion provided at a central portion thereof, onto a front surface of the upper base fabric and sewing outer peripheries of the two base fabrics to each other; turning the lower base fabric inside out and leading the base ends of the hanging strings out of the opening portion of the lower base fabric; fixing a hanging-string retaining ring to the base ends of the hanging strings; fixing an air-bag retaining ring to the opening portion of the lower base fabric; and overlapping both the retaining rings to each other and securing these rings to a mounting base provided around a gas generator.

According to the present invention having the above features, the operation of securing the opening portion of the air bag and the base ends of the hanging strings to the mounting base is accomplished by integrally mounting by appropriate means the retaining ring and the air bag opening portion together to the mounting base, while clamping and fixing the opening portion of the air bag between the retaining ring fixed with the hanging strings and the mounting base. When the opening portion of the air bag is to be fixed to another retaining ring, that retaining ring and the hanging-string retaining ring are overlapped to each other and secured to the mounting base. This makes it possible to conduct an attaching operation of the air bag and the hanging strings easily and quickly, without doing a sewing through a narrow opening of the bag as in the prior art.

If the hanging-string retaining ring is provided, in a recessed manner, with steps, and the base end of each hanging string is fixed to the step, the hanging-string retaining ring and the air-bag retaining ring can be brought into close contact with each other, leading to an increase in mounting strength.

If an adhesive is interposed among the base end of the hanging string, the opening portion of the air bag, the two retaining rings and the mounting base, it is possible to provide not only a further increased mounting strength but also an increase in sealability against a high pressure gas.

In producing the air bag system, it is unnecessary to conduct a sewing through a narrow opening of the bag and hence, it becomes easy to produce the air bag. Further, by turning the lower base fabric inside out, the sewn portions of the lower and upper base fabrics cannot be seen from the outside, leading to an improved external appearance.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 5 illustrate an air bag system according to a first embodiment of the present invention, wherein FIG. 1 is a front view of a steering wheel with the air bag system mounted thereon;

FIG. 2 is a sectional view taken along a line II—II in FIG. 1;

FIG. 3 is a segmentary view taken along a line III—III in FIG. 2;

FIGS. 6 to 8 illustrate a second embodiment of the present invention, wherein

FIG. 6 is a view similar to FIG. 4A, and illustrating a hanging string in a state in which it has been fixed to a retaining ring;

FIG. 7 is a view similar to FIG. 4B, and illustrating an air bag in a state in which it has been mounted to a mounting base; and FIG. 8 is a view similar to FIG. 5E, and illustrating the air bag before it is mounted to the mounting base.

DESCRIPTION OF THE PREFERRED EMBODIMENTS

The present invention will now be described by way of embodiments in connection with the accompanying drawings.

FIGS. 1 to 5 illustrate a first embodiment of the present invention.

Figure 1:
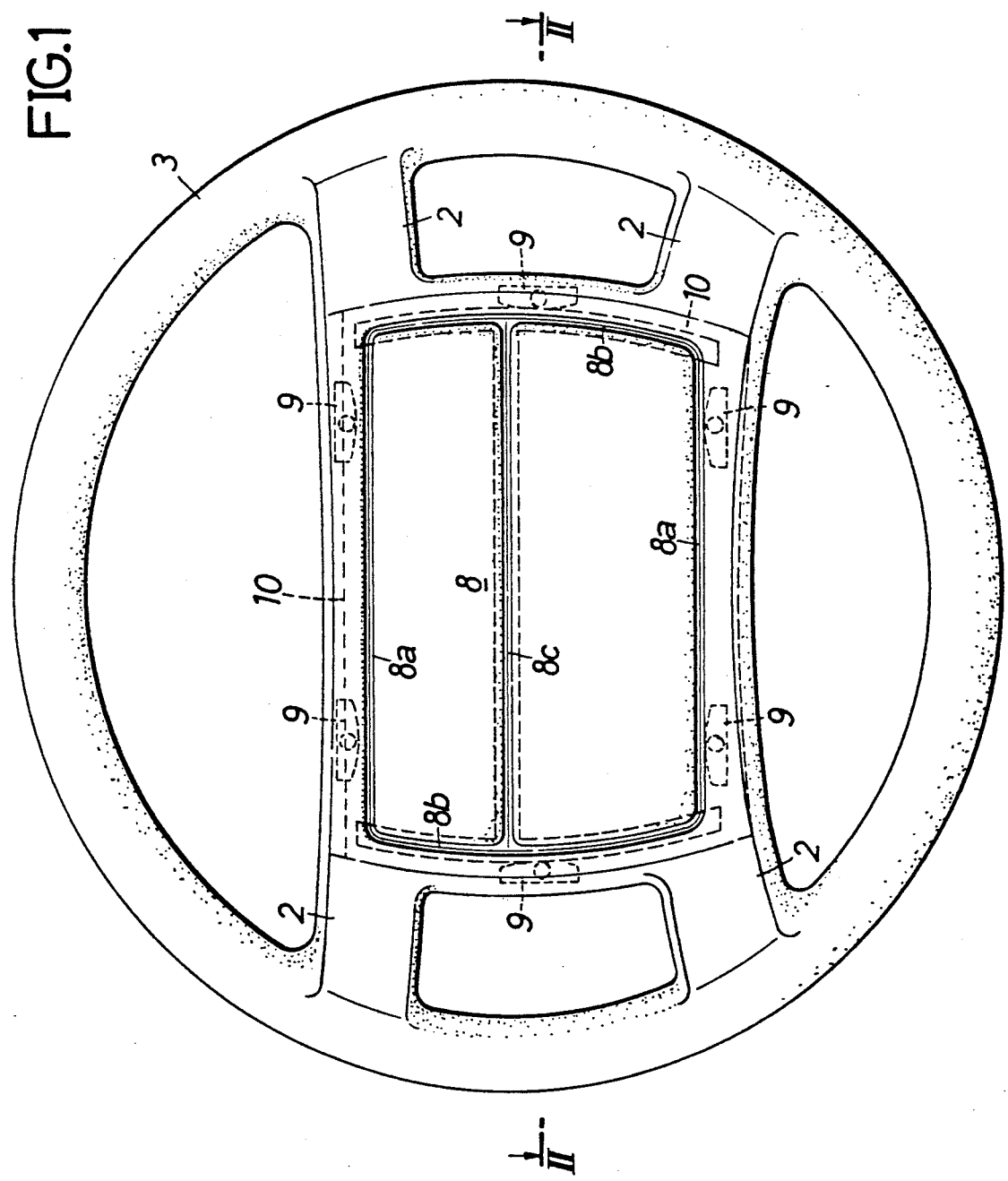
Figure 2:
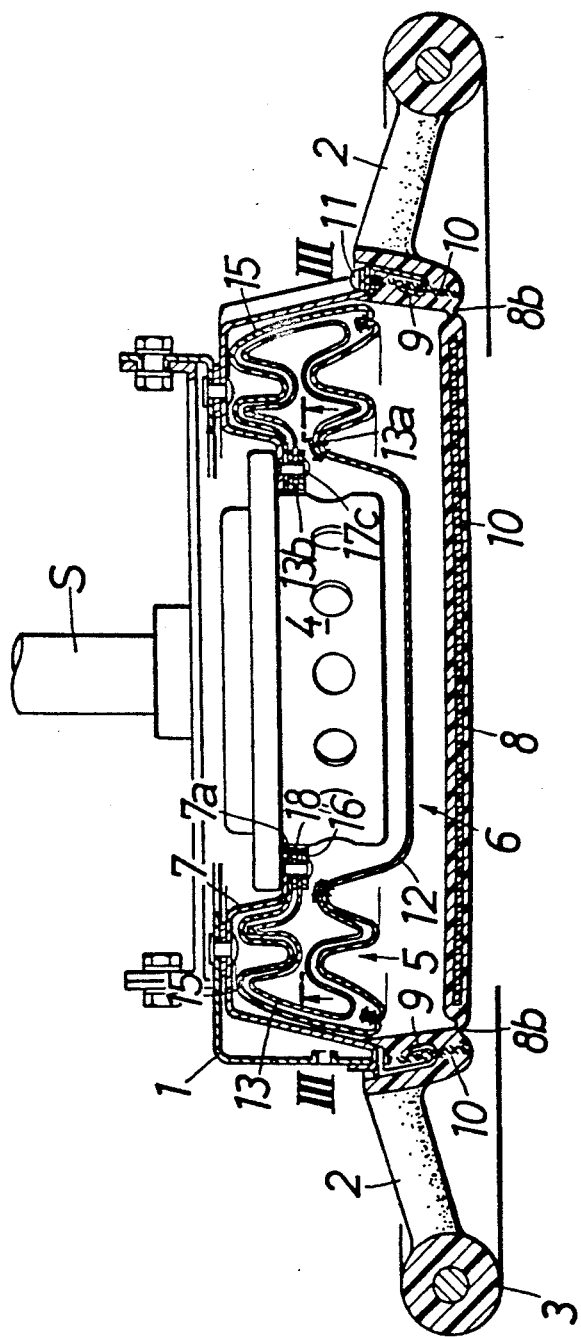

Referring to FIGS. 1 and 2, a steering wheel 3 is mounted through an arm 2 to an outer periphery of a mounting portion 1 secured to a tip end of a steering shaft S. An air bag system 6 is mounted to a central portion of the steering wheel 3 and is comprised of a gas generator 4 and an air bag 5.

More specifically, a cup-like container 7 made of a metallic material is mounted to the mounting portion 1, and the gas generator 4 is mounted in an opening portion provided at a central portion of a bottom of the container 7. The gas generator 4 comprises a gunpowder for generating a combustion gas and an electrical detonator for igniting the gunpowder. The air bag 5 is air-tightly mounted in a folded state to a mounting base 7a formed around an outer periphery of the opening portion of the container 7, so as to surround an outer periphery of the gas generator 4. The air bag 5 may be inflated and developed by a high pressure gas produced by burning the gunpowder.

A surface of the air bag system 6 is covered with a modular cover 8 which is made of a synthetic resin material and also serves as a pad. A reinforcing net 10 of a synthetic fiber material is integrally embedded in the modular cover 8 with its outer periphery retained to a plurality of hooks 9. The modular cover 8 is attached to the central portion of the steering wheel 3 by clamping base portions of the hooks 9 to an outer periphery of the container 7 by bolts 11.

Provided on a front-surface of the modular cover 8 are two upper and lower transverse grooves 8a, two left and right longitudinal grooves 8b, and a central groove 8c extending substantially parallel to and centrally between the transverse grooves 8a. Portions of the reinforcing net 10 corresponding to an H-shaped area (indicated by a dashed line in FIG. 1) extending along the longitudinal grooves 8b and the central groove 8c are partially cut off, and further, a cutout is also provided on a back surface of the modular cover 8 along the H-shaped area, thereby making the strength of the area especially low.

Figure 3:
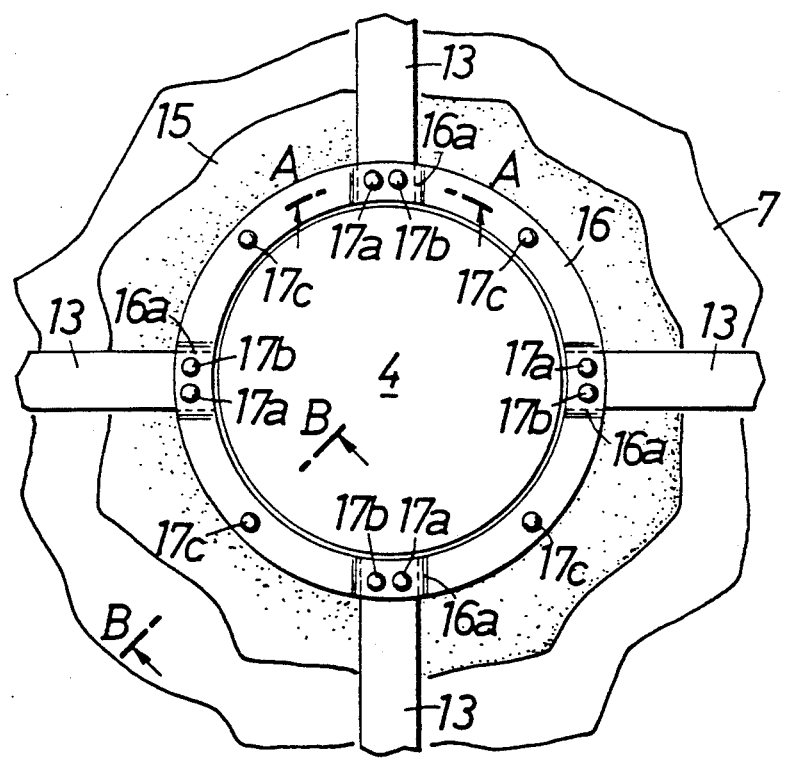

The structure of the air bag 5 and a process of production thereof will be described below in connection with FIGS. 3 to 5.

Figure 5A:
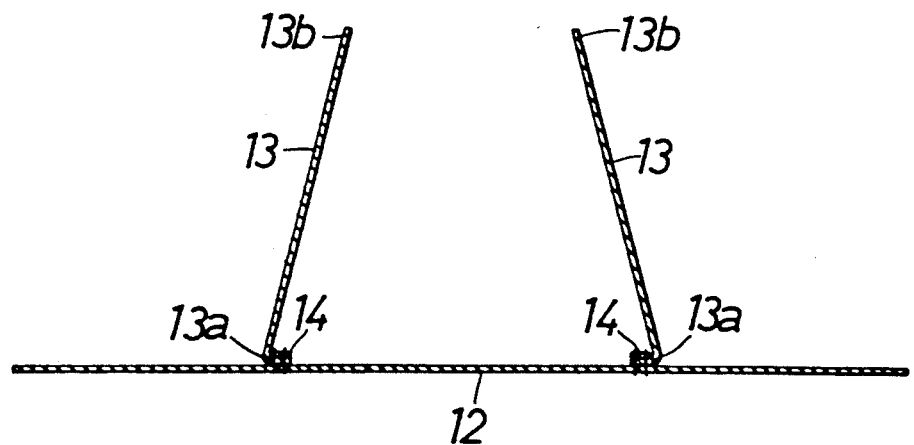
FIGS. 5A to 5E are views illustrating steps for producing the air bag.

First, as shown in FIG. 5A, tip ends 13a of four band-like hanging strings 13 are sewn to a back surface of an upper circular base fabric or cloth 12 at circumferentially equal distances, through reinforcing fabrics or cloths 14. The base fabric 12 is made of a soft material such as a synthetic fiber material and having a coating applied thereon for preventing leakage of a gas.

Figure 5B:
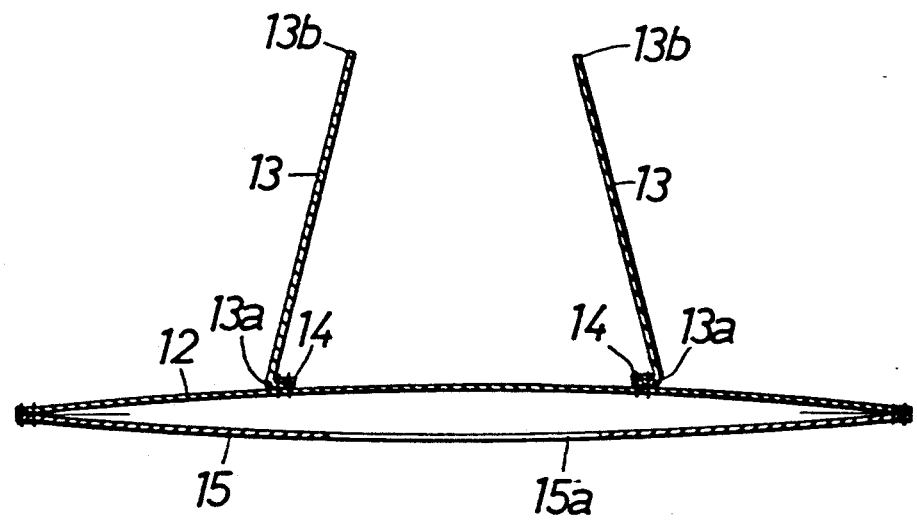

Then, as shown in FIG. 5B, a lower base fabric or cloth 15 having the same diameter as the upper base fabric 12 and a circular opening portion 15a provided at a central portion thereof is overlapped onto the front surface of the upper base fabric 12 so that the front surface of the base fabric 15 contacts the front surface of the fabric 12. The fabrics are sewn together at their outer peripheries.

Figure 5C:
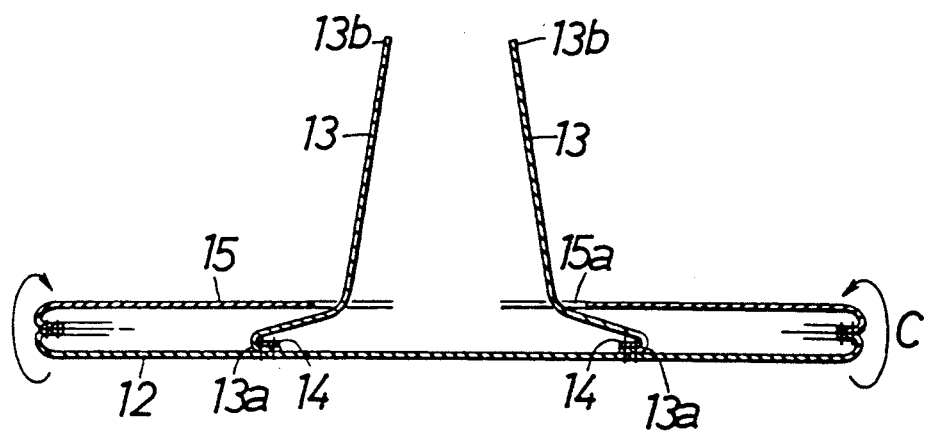

As shown in FIG. 5C, the lower base fabric 15 is turned inside out by folding back the opening portion 15a outwardly in the direction of an arrow C, so that the front surface of the fabric 15 which has been opposed to the upper base fabric 12 heretofore is then exposed to the outside. And base ends 13b of the four hanging strings 13 are led out of the opening portion 15a of the lower base fabric 15 to the outside.

Figure 5D:
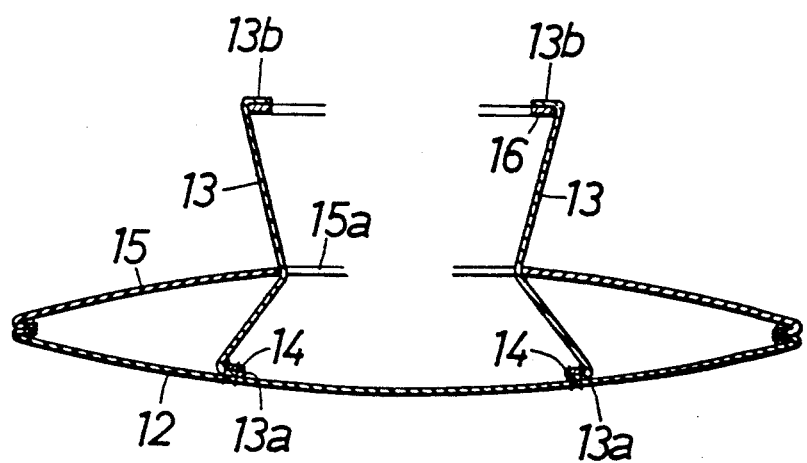

Subsequently, as shown in FIG. 5D, the base ends of the hanging strings 13 are bonded to a lower surface of a hanging-string retaining ring 16, i.e., to a surface remote from an occupant in a condition in which the air bag system 6 has been mounted in position, and at the same time, the hanging strings 13 and the hanging-string retaining ring 16 are fixed by use of rivets 17a, one rivet for each hanging string 13. As can be seen from FIGS. 3 and 4A, a step 16a having a depth equal to the thickness of the hanging string 13 is provided in a recessed manner in the hanging-string retaining ring 16 in correspondence to the mounting position of each of four hanging strings 13. Hence, at this time, the base ends 13b of the hanging strings 13 engaged in recesses defined by the steps 16a are fixed thereto through an adhesive and the rivets 17a.

Figure 5E:
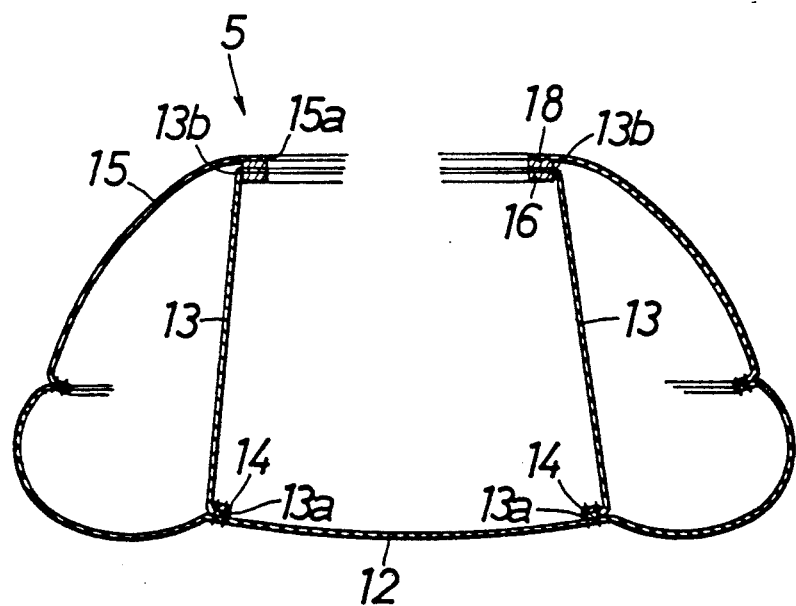

As shown in FIG. 5E, the opening portion 15a of the lower base fabric 15 is bonded to a lower surface of a flat, air bag retaining ring 18 having the same dimension as the hanging-string retaining ring 16, i.e., to that surface of the ring 18 which is remote from the occupant, and is further fixed thereto also through four rivets 17b. At this time, as can be seen from FIG. 4A, the base ends 13b of the hanging strings 13 are clamped between the two retaining rings 16 and 18, and the four rivets 17b pass not only through the lower base fabric 15 and the air bag retaining ring 18 but also through the hanging strings 13 and the hanging-string retaining ring 16 to clamp them together. Thus, the lower surface of the hanging-string retaining ring 16 and the lower surfaces of the hanging strings 13 are brought into close contact with the upper surface of the air bag retaining ring 18 without any clearance by the action of the steps 16a provided in the recessed manner in the hanging-string retaining ring 16.

Figure 4A:
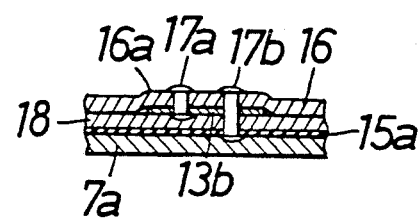
FIG. 4A and 4B are enlarged sectional views taken along lines A—A and B—B in FIG. 3, respectively.
Figure 4B:
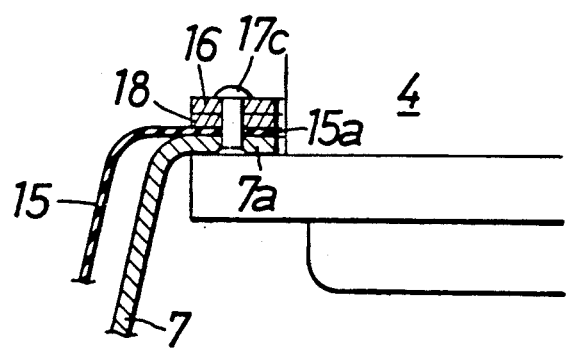

As shown in FIG. 4B, the opening portion 15a of the lower base fabric 15 fixed to the air bag retaining ring 18 is bonded to the mounting base 7a around the opening in the container 7, and the four rivets 17c are inserted from the lower surface of the mounting base 7a through the lower base fabric 15, the air bag retaining ring 18 and the hanging-string retaining ring 16 to integrally clamp them together, thereby completing the assembling.

The operation of the first embodiment of the present invention having the above-described structure will be described below.

If a sensor senses a collision of a vehicle and delivers a signal to the gas generator 4, the detonator is operated to ignite the gunpowder, so that the air bag 5 is supplied with a produced high pressure combustion gas to start its inflation. If a pressure is applied to an inner surface of the modular cover 8 by the inflation of the air bag 5, the modular cover 8 breaks at the H-shaped area extending along the longitudinal grooves 8b and the central groove 8c and is spreaded outwardly about the transverse grooves 8a serving as hinge means. The air bag 5 is inflated from an opening provided by the breakage and spreading of the modular cover 8 into a vehicle compartment and developed in a position between the occupant and the steering wheel 3.

When the air bag 5 is being inflated, the upper and lower base fabrics 12 and 15 are moved away from each other by the supplied high pressure gas, but the maximum distances of movement of the base fabrics 12 and 15 are restrained by stretching of the hanging strings 13 to their full lengths, so that the air bag 5 is developed into a shape flat in a direction perpendicular to a direction of ejection of the high pressure gas. This causes a wide region in front of the occupant to be covered by the air bag 5, thereby ensuring that the occupant can be reliably held upon a collision of the vehicle.

Figure 6:
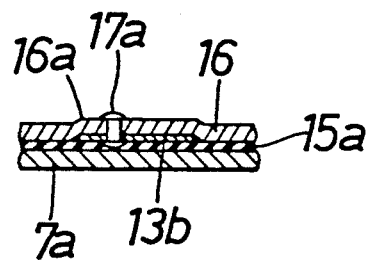
Figure 7:
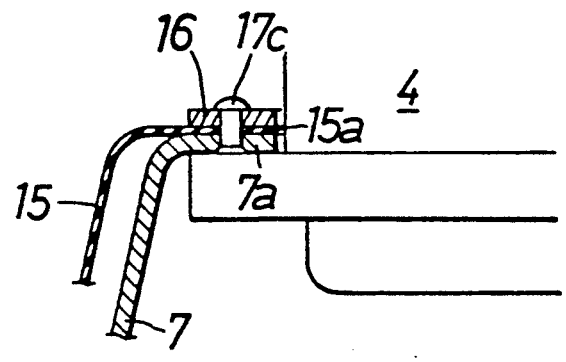
Figure 8:
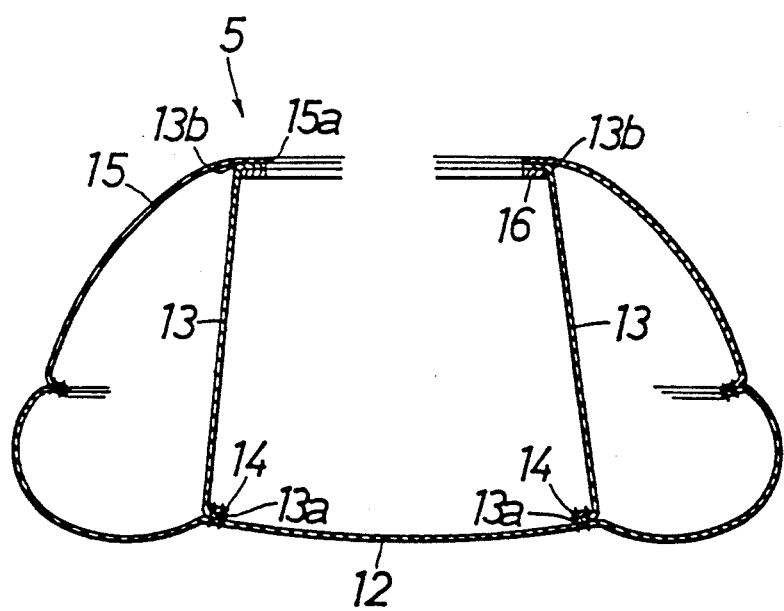

FIGS. 6 to 8 illustrate a second embodiment of the present invention, which is different from the previously described first embodiment in that the air bag retaining ring 18 is eliminated. Other arrangements are identical to the first embodiment. Therefore, members or components corresponding to those in the first embodiment are designated by the like reference numerals and characters.

In the second embodiment, the base ends 13b of the hanging strings 13 are each bonded to the step 16a of the hanging-string retaining ring 16 and also fixed thereto by the rivets 17a and then, the lower base fabric 15, the hanging-string retaining ring 16 and the mounting base 7a are integrally assembled with one another by use of rivets 17c, so that the opening portion 15a of the lower base fabric 15 is clamped between the hanging-string retaining ring 16 and the mounting base 7a. Alternatively, the opening portion 15a of the lower base fabric 15 and the hanging-string retaining ring 16 may be fixed to each other by adhesive bonding and/or by use of rivets and then integrally assembled to the mounting base 7a. In the second embodiment, it is possible to provide a further simplification in structure and producing procedure, as compared to the first embodiment.

According to the first and second embodiments, it is possible to easily sew the upper base fabric 12, the lower base fabric 15 and the hanging strings 13 to one another, and in producing the air bag system 6, the assembling operation is very much simplified, because the base ends 13b of the hanging strings 13 are fixed to the retaining ring 16.

Although the embodiments of the present invention have been described, it will be understood that the present invention is not limited to the above embodiments, and various minor modifications in design may be made without departing from the spirit and scope of the present invention defined in claims.

For example, other than the rivets 17a to 17c, any suitable means such as bolts may be used to secure the hanging strings 13 and the hanging-string retaining ring 16 to each other, the lower base fabric 15 and the air bag retaining ring 18 to each other, or both the retaining rings 16 and 18 and the mounting base 7a to each other.

In addition, the string 13 is not limited to the band-like form, and a rope-like hanging string of a circular cross-section may be used.

It is evident that the present invention is not limited to the air bag system using a combustion gas generated from the gunpowder and is also applicable to an air bag system using a high pressure gas contained in a gas cylinder.

What is claimed is:

1. A process for producing an air bag system, comprising the steps of:
    sewing tip ends of hanging strings to appropriate portions on a back surface of an upper base fabric;
    overlapping a front surface of a lower base fabric having an opening portion provided at a central portion thereof, onto a front surface of said upper base fabric and sewing outer peripheries of said two base fabrics to each other;
    turning said lower base fabric inside out and leading the base ends of said hanging strings out of the opening portion of said lower base fabric;
    fixing a retaining ring to the base ends of said hanging strings; and
    securing said retaining ring to a mounting base provided around a gas generator, so that the opening portion of said lower base fabric is clamped and fixed between said retaining ring and said mounting base.

2. A process for producing an air bag system, comprising the steps of:
    sewing tip ends of hanging strings to appropriate portions on a back surface of an upper base fabric;
    overlapping a front surface of a lower base fabric having an opening portion provided at a central portion thereof, onto a front surface of said upper base fabric and sewing outer peripheries of said two base fabrics to each other;
    turning said lower base fabric inside out and leading the base ends of said hanging strings out of said opening portion of said lower base fabric;

fixing a hanging-string retaining ring to the base ends of said hanging strings;
fixing an air-bag retaining ring to the opening portion of said lower base fabric; and
overlapping both the retaining rings to each other and securing these rings to a mounting base provided around a gas generator.

* * * * *